(12) United States Patent
Jones

(10) Patent No.: US 9,308,955 B2
(45) Date of Patent: Apr. 12, 2016

(54) NON-CONTACT INTERLOCKING ASSEMBLY

(71) Applicant: Honda Motor Co., Ltd., Tokyo (JP)

(72) Inventor: David T. Jones, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 13/949,551

(22) Filed: Jul. 24, 2013

(65) Prior Publication Data

US 2015/0026960 A1    Jan. 29, 2015

(51) Int. Cl.
| | | |
|---|---|---|
| *B23Q 7/14* | (2006.01) | |
| *B62D 65/18* | (2006.01) | |
| *B25J 15/00* | (2006.01) | |
| *B62D 27/02* | (2006.01) | |
| *B23K 37/04* | (2006.01) | |

(52) U.S. Cl.
CPC ............... *B62D 65/18* (2013.01); *B25J 15/00* (2013.01); *B23K 37/0452* (2013.01); *B23Q 7/1426* (2013.01); *B62D 27/02* (2013.01); *Y10T 29/49622* (2015.01); *Y10T 29/49627* (2015.01); *Y10T 29/49826* (2015.01); *Y10T 29/49998* (2015.01); *Y10T 29/53039* (2015.01); *Y10T 29/53052* (2015.01); *Y10T 29/53061* (2015.01); *Y10T 29/53091* (2015.01)

(58) Field of Classification Search
CPC ......... B62D 27/02; B62D 65/18; B25J 15/00; Y10T 29/53091; Y10T 29/53061; Y10T 29/53039; Y10T 29/53052; Y10T 29/49826; Y10T 29/49622; Y10T 29/49627; B23K 37/0452; B23Q 7/1426
See application file for complete search history.

(56) References Cited

U.S. PATENT DOCUMENTS

2014/0124551 A1*  5/2014  Condon et al. ................ 224/324

FOREIGN PATENT DOCUMENTS

| | | |
|---|---|---|
| CN | 201432178 Y | 3/2010 |
| JP | 11197976 | 7/1990 |
| JP | 03277435 | 12/1991 |

* cited by examiner

*Primary Examiner* — John C Hong
(74) *Attorney, Agent, or Firm* — Armstrong Teasdale LLP

(57) ABSTRACT

An interlocking assembly includes a frame, a first arm coupled to the frame, and a second arm coupled to the frame. The first arm and/or the second arm is moveable between an open position and a closed position, such that the first and second arms overlap to define a first area when the first and second arms are in the closed position.

18 Claims, 6 Drawing Sheets

NON-CONTACT INTERLOCKING ASSEMBLY

BACKGROUND

The present disclosure relates to mechanisms and, more particularly, to an interlocking assembly that controls the behavior of a body being assembled in the event the body becomes dislodged during the assembly process.

At least some known vehicles are assembled in an assembly line. To transfer and/or handle the vehicle during assembly of the vehicle, at least some portions of the vehicle are handled using a handling jig. For example, at least some known vehicle components are retained by the handling jig while the vehicle is being welded and/or otherwise worked on. Through machine and/or operator error, it may be possible for the component to be inadvertently jarred, dropped, and/or otherwise mishandled during the transfer and/or handling of the vehicle body.

BRIEF SUMMARY

In one aspect, a method is provided for controlling a behavior of a vehicle body. The method includes coupling a first securing mechanism to the vehicle body, and positioning a second securing mechanism at least partially around a portion of the vehicle body.

In another aspect, an interlocking assembly is provided for use in a vehicle assembly environment. The interlocking assembly includes a frame, a first arm coupled to the frame, and a second arm coupled to the frame. The first arm and/or the second arm is moveable between an open position and a closed position, such that the first and second arms overlap to define a first area when the first and second arms are in the closed position.

In yet another aspect, a system is provided for use in a vehicle assembly environment. The system includes a handling jig configured to move a vehicle body towards a first position, an interlocking assembly including a first arm and a second arm that are each moveable between an open position and a closed position, an actuating mechanism coupled to the interlocking assembly, and a computing device coupled to the actuating mechanism. The vehicle body includes a center pillar. The computing device includes a processor, and a computer-readable storage media having computer-executable instructions embodied thereon. When executed by the processor, the computer-executable instructions cause the processor to determine that the center pillar is in the first position, and actuate the actuating mechanism to move the first arm and/or the second arm towards the closed position, such that the first and second arms overlap to define a first area, and the center pillar extends through at least a portion of the first area.

The features, functions, and advantages described herein may be achieved independently in various embodiments of the present disclosure or may be combined in yet other embodiments, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The present disclosure relates to safety mechanisms and, more particularly, to a non-contact interlocking assembly that controls the behavior of a vehicle body in assembly process. In one embodiment, a handling jig moves an assembly component, such as a vehicle body, towards a first position. The non-contact interlocking assembly includes a first arm and a second arm that are selectively moveable between an open position and a closed position. For example, when a center pillar of the vehicle body is in a first position, at least one of the first and second arms is moved towards the closed position, such that the first and second arms overlap to define a first area, and such that the center pillar extends through at least a portion of the first area. Accordingly, the non-contact interlocking assembly substantially circumscribes at least a portion of the center pillar without contacting the center pillar to provide a degree of control while the vehicle body is being assembled and/or transferred between locations.

As used herein, an element or step recited in the singular and preceded with the word "a" or "an" should be understood as not excluding plural elements or steps, unless such exclusion is explicitly recited. Furthermore, references to an "implementation" or an "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

Figure 1:
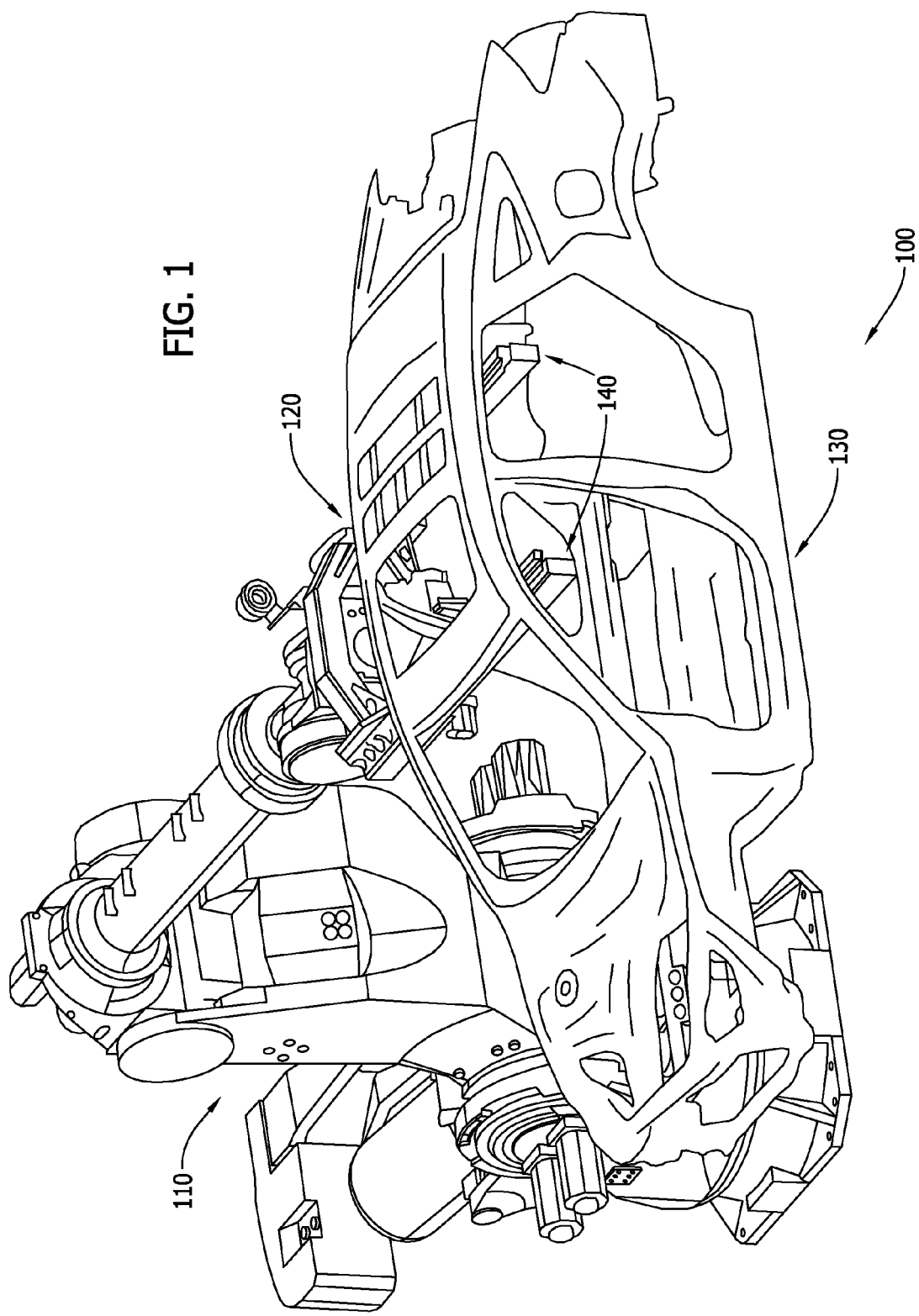
FIG. 1 is a schematic illustration of an exemplary vehicle assembly environment.

FIG. 1 is a schematic illustration of an exemplary vehicle assembly environment 100. In the exemplary embodiment, environment 100 includes a robot 110 and a handling jig 120 coupled to robot 110. In the exemplary embodiment, robot 110 is configured to move handling jig 120, such that handling jig 120 approaches and/or engages a vehicle body 130. In the exemplary embodiment, vehicle body 130 may be associated with any vessel, aircraft, and/or vehicle including, without limitation, an automobile, a truck, a boat, a helicopter, and/or an airplane.

In the exemplary embodiment, handling jig 120 includes at least one support mechanism 140 that is configured to vertically support vehicle body 130. More specifically, in the exemplary embodiment, support mechanisms 140 are oriented to face an underside of a portion of vehicle body 130 (e.g., an upper frame), such that handling jig 120 facilitates lifting of vehicle body 130 by robot 110. Alternatively, handling jig 120 may be configured to support any portion of vehicle body 130 that enables the methods and systems to function as described herein.

Figure 2:
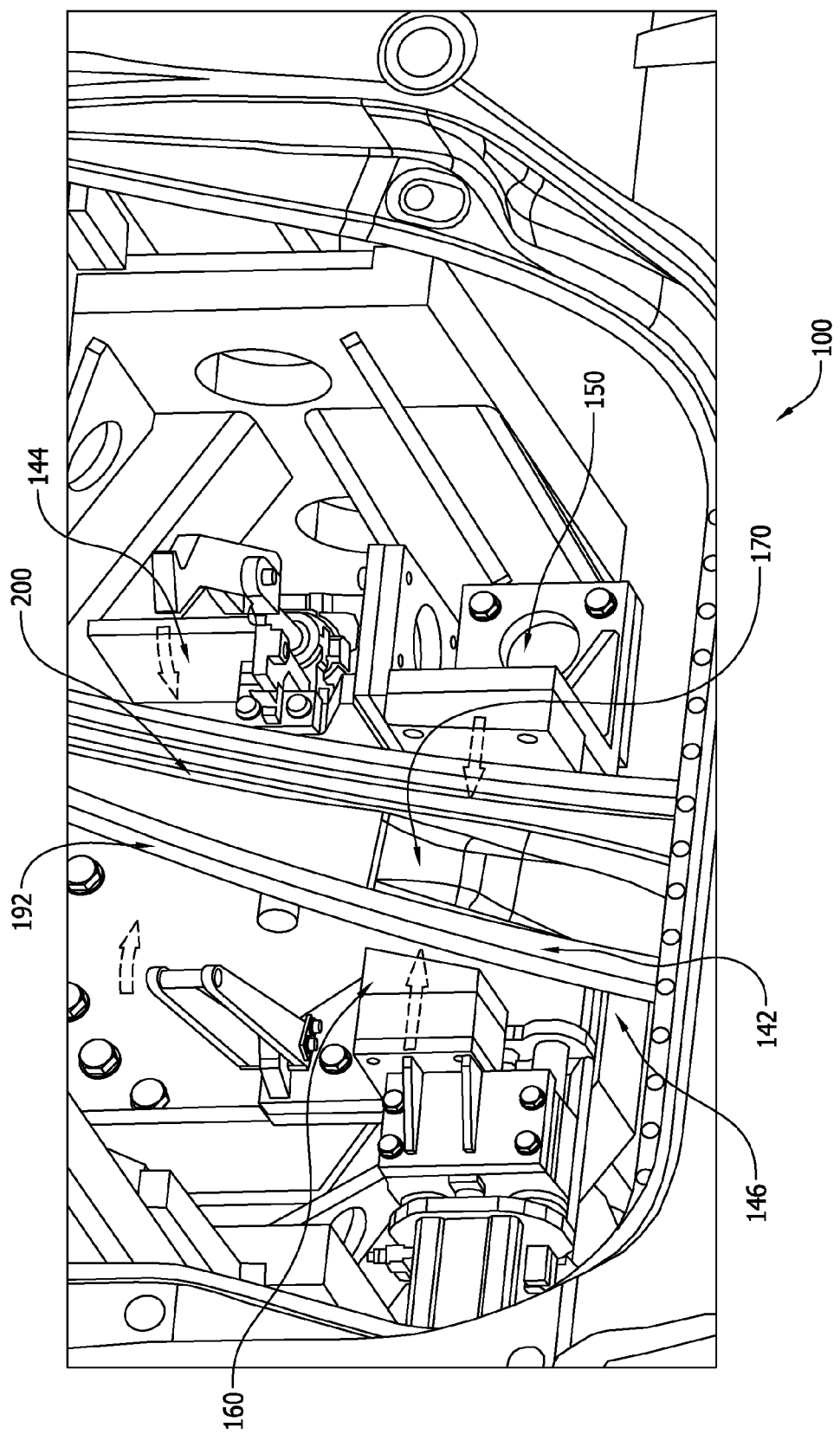
FIG. 2 is a detailed schematic illustration of the vehicle assembly environment shown in FIG. 1.

FIG. 2 is a detailed schematic illustration of environment 100. In the exemplary embodiment, handling jig 120 includes a first securing mechanism 142 that includes a pad 150 and a crowding device 160 that are configured to laterally support vehicle body 130. In the exemplary embodiment, pad 150 is oriented to face a first side 144 of a portion of vehicle body 130 (e.g., a center pillar 170), and crowding device 160 is oriented to face a second, opposing side 146 of the portion of vehicle body 130.

In the exemplary embodiment, crowding device 160 is coupled to an actuating mechanism 180, for example, but not limited to, an air cylinder, a hydraulic cylinder, a screw-type drive, and/or any other device or system that is configured to move crowding device 160 towards pad 150, such that pillar 170 is in a first position between pad 150 and crowding device 160. Alternatively, pad 150 and/or crowding device 160 may be configured to support any portion of vehicle body 130 using any mechanism that enables the methods and systems to function as described herein.

In the exemplary embodiment, handling jig 120 also includes a second securing mechanism 192 that includes an interlocking assembly 200 that facilitates controlling a behavior of vehicle body 130 in the event vehicle body 130 becomes inadvertently dislodged from handling jig 120 during an abnormal operating condition (e.g., machine failure, program anomaly, human error).

Figure 3:
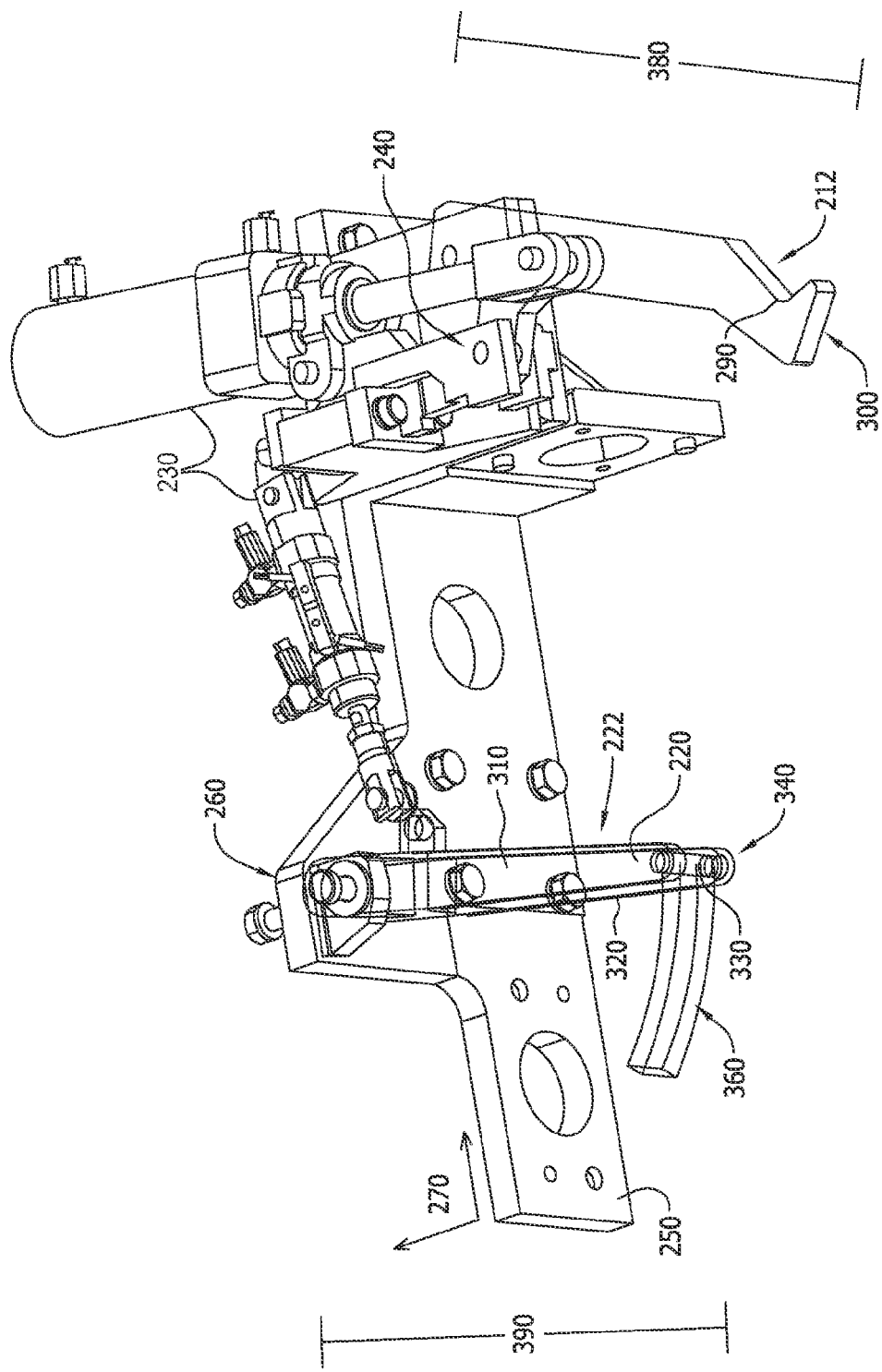
FIG. 3 is a perspective view of an exemplary interlocking assembly that may be used in the vehicle assembly environment shown in FIG. 1 and in an open configuration.
Figure 4:
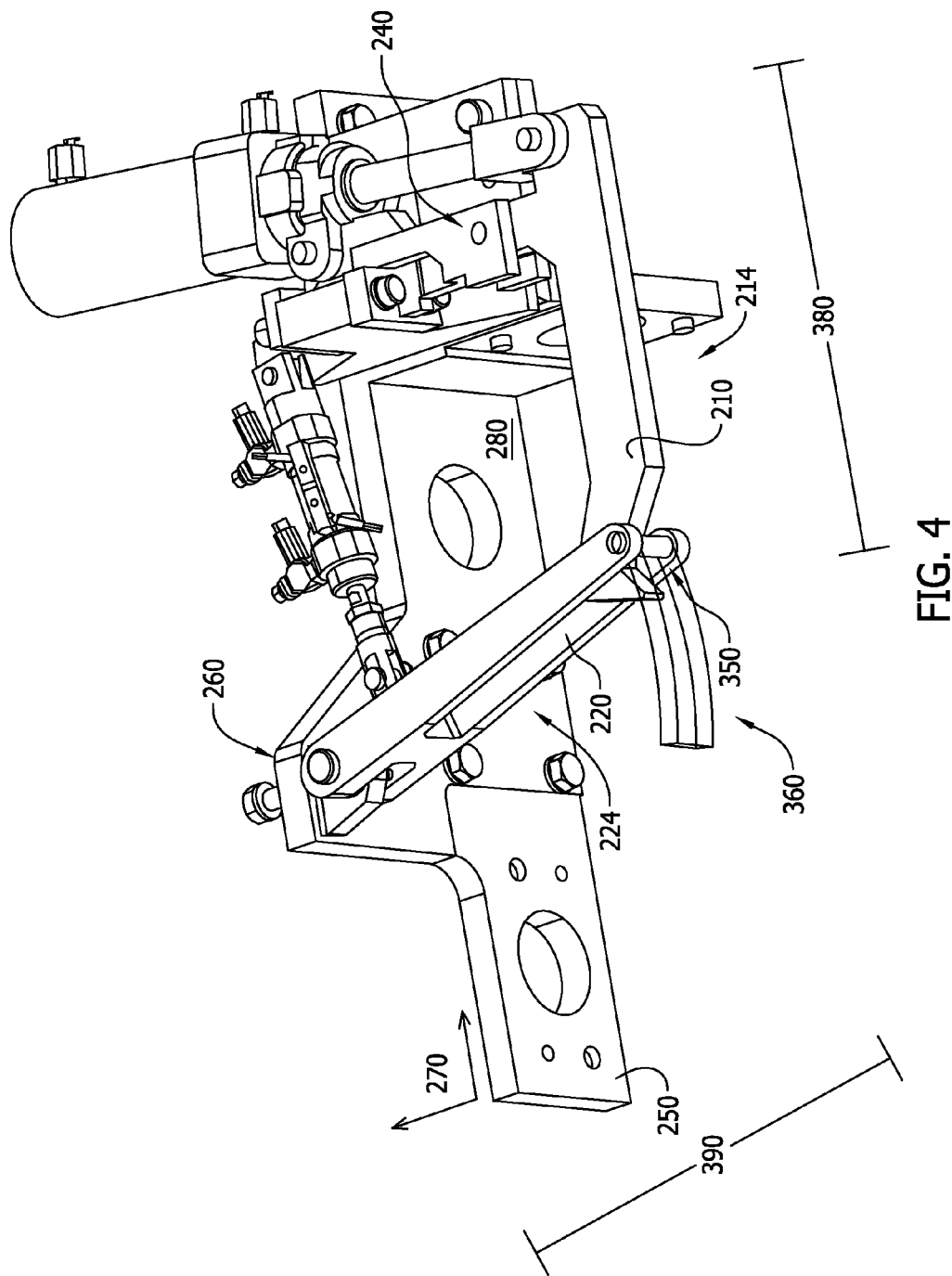
FIG. 4 is a perspective view of the interlocking assembly shown in FIG. 3 and in a closed configuration.

FIG. 3 is a perspective view of interlocking assembly 200 in an open configuration, and FIG. 4 is a perspective view of interlocking assembly 200 in a closed configuration. In the exemplary embodiment, interlocking assembly 200 includes a first arm 210 that is selectively moveable between an open position 212 (shown in FIG. 3) and a closed position 214 (shown in FIG. 4), and a second arm 220 that is selectively moveable between an open position 222 (shown in FIG. 3) and a closed position 224 (shown in FIG. 4). In the exemplary embodiment, first arm 210 and second arm 220 are each coupled to a respective actuating mechanism 230 (e.g., an air cylinder) that is configured to move arms 210, 220 between respective open positions 212, 222 and respective closed positions 214, 224. Alternatively, one of first arm 210 and second arm 220 may be stationary, and the other of first arm 210 and second arm 220 is configured to move between open position 212, 222, and closed position 214, 224, respectively.

In the exemplary embodiment, first arm 210 is coupled to a first portion 240 of a frame 250, and second arm 220 is coupled to a second portion 260 of frame 250. More specifically, in the exemplary embodiment, first arm 210 is hingably coupled to first portion 240, such that first arm 210 is rotatable and/or sweepable between open position 212 and closed position 214, and second arm 220 is hingably coupled to second portion 260, such that second arm 220 is rotatable and/or sweepable between open position 222 and closed position 224.

In the exemplary embodiment, first arm 210 and second arm 220 are both sweepable within a common plane 270, such that second arm 220 is configured to engage first arm 210 when both first arm 210 and second arm 220 are in closed position 214 and 224, respectively. In the exemplary embodiment, first arm 210 and second arm 220 overlap to define a first area 280 (shown in FIG. 4) extending within first plane 270 when both first arm 210 and second arm 220 are in closed position 214 and 224, respectively.

In the exemplary embodiment, first arm 210 has a first configuration, and second arm 220 has a second configuration that complements the first configuration to enable interlocking assembly 200 to control a behavior of vehicle body 130. In the exemplary embodiment, first arm 210 includes a hook 290 (shown in FIG. 3) at a distal portion 300 (shown in FIG. 3) of first arm 210, and second arm 220 includes a first extension member 310 (shown in FIG. 3), a second extension member 320 (shown in FIG. 3) extending generally parallel to first extension member 310, and a linking member 330 (shown in FIG. 3) extending between a distal portion 340 (shown in FIG. 3) of first and second extension members 310 and 320. Alternatively, first arm 210 and/or second arm 220 may have any configuration that enables interlocking assembly 200 to function as described herein.

In the exemplary embodiment, second arm 220 is configured to remain a distance from and does not contact first arm 210 during normal operation of interlocking assembly 200 when both first arm 210 and second arm 220 are in closed position 214 and 224, respectively. More specifically, in the exemplary embodiment, a clearance 350 (shown in FIG. 4) of about 2.0 mm is defined and/or provided between first arm 210 and a path 360 of second arm 220. Clearance 350 enables first arm 210 to not contact second arm 220 during normal operation of interlocking assembly 200 when both first arm 210 and second arm 220 are in closed position 214 and 224, respectively. Alternatively, clearance 350 may be any distance that enables interlocking assembly 200 to function as described herein.

In the exemplary embodiment, first arm 210 has a first length 380, and second arm has a second length 390 that work in cooperation to enable hook 290 to engage linking member 330 when a force is applied from first area 280 towards first arm 210 and/or second arm 220. For example, in one implementation, the force may be applied towards first arm 210 and/or second arm 220 when vehicle body 130 slips from handling jig 120, and pillar 170 is shifted towards a second position (i.e., a position not between pad 150 and crowding device 160). Accordingly, in such an implementation, first arm 210 and/or second arm 220 establish a degree of control of vehicle body 130 in the event vehicle body 130 becomes inadvertently dislodged from handling jig 120.

In one implementation, actuating mechanism 230 associated with first arm 210 is a locking-type cylinder that maintains a position of first arm 210 when a force applied from first area 280 and/or towards first arm 210 and/or second arm 220 is less than a predetermined threshold, and "gives" (i.e., allows first arm 210 to be moved by the force) when the force is equal to or greater than the predetermined threshold. Accordingly, in such an implementation, first arm 210 moves towards second arm 220 when a force of vehicle body 130 against first arm 210 is greater than or equal to the predetermined threshold. The predetermined threshold enables first arm 210 to not contact second arm 220 during normal operation of interlocking assembly 200 when both first arm 210 and second arm 220 are in closed position 214 and 224, respectively.

Figure 5:
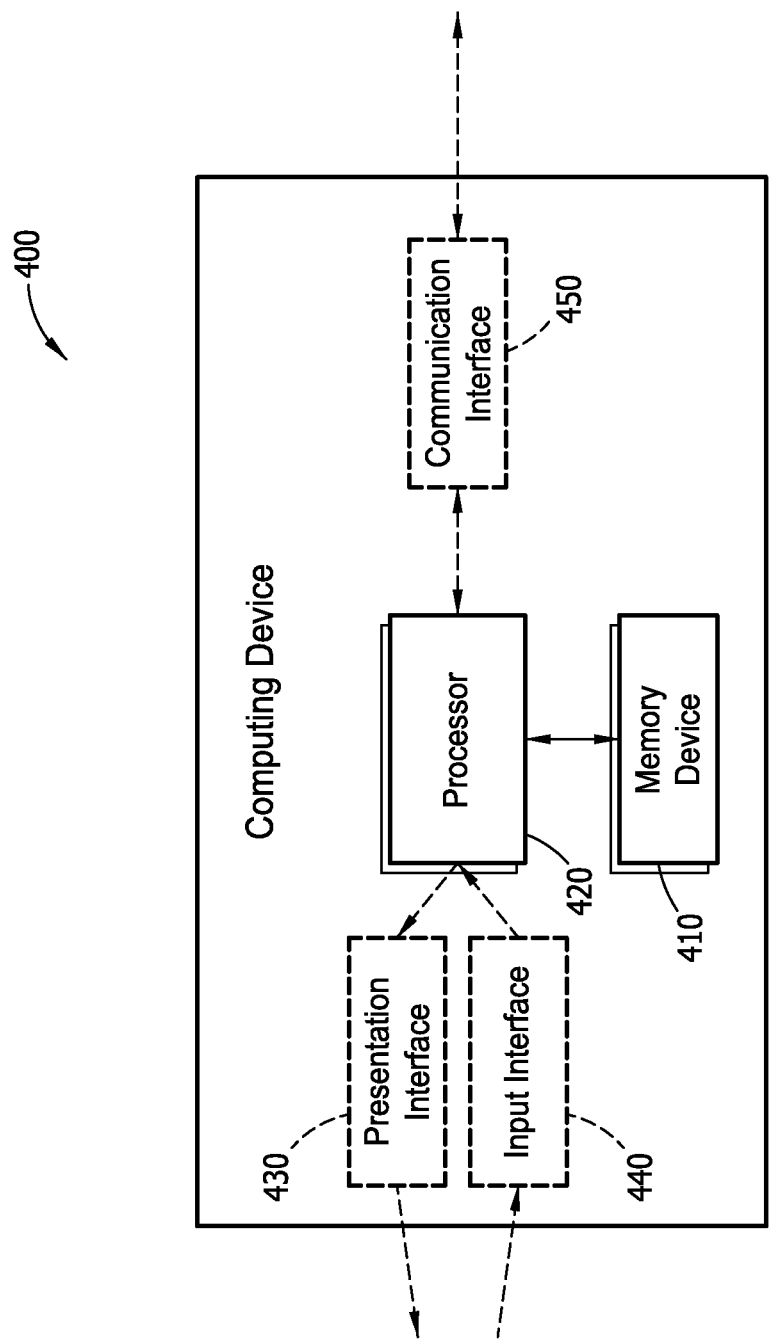
FIG. 5 is a schematic illustration of an exemplary computing device that may be used in the vehicle assembly environment shown in FIG. 1.

FIG. 5 is a schematic illustration of computing device 400. In the exemplary embodiment, computing device 400 includes at least one memory device 410 and a processor 420 that is coupled to memory device 410 for executing instructions. In some implementations, executable instructions are stored in memory device 410. In the exemplary embodiment, programming processor 420 performs one or more operations described herein. For example, processor 420 may be programmed by encoding an operation as one or more executable instructions, storing the executable instructions in memory device 410, and subsequently providing the executable instructions to processor 420.

Processor 420 may include one or more processing units (e.g., in a multi-core configuration). Further, processor 420 may be implemented using one or more heterogeneous processor systems in which a main processor is present with secondary processors on a single chip. In another illustrative example, processor 420 may be a symmetric multi-processor system containing multiple processors of the same type. Further, processor 420 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 410 is one or more devices that enable information such as executable instructions and/or other data to be stored and retrieved. Memory device 410 may include one or more computer readable media, such as, without limitation, dynamic random access memory (DRAM), static random access memory (SRAM), a solid state disk, and/or a hard disk. Memory device 410 may be configured to store, without limitation, application source code, application object code, source code portions of interest, object code portions of interest, configuration data, execution events and/or any other type of data.

In the exemplary embodiment, computing device 400 includes a presentation interface 430 that is coupled to processor 420. Presentation interface 430 may include a display adapter (not shown) that may be coupled to a display device, such as a cathode ray tube (CRT), a liquid crystal display (LCD), an organic LED (OLED) display, and/or an "electronic ink" display. In some implementations, presentation interface 430 includes one or more display devices.

In the exemplary embodiment, computing device 400 includes an input interface 440 that is coupled to processor 420. Input interface 440 is configured to receive input from a user. Input interface 440 may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 430 and input interface 440.

Computing device 400, in the exemplary embodiment, includes a communication interface 450 coupled to processor 420. Communication interface 450 communicates with one or more remote devices. To communicate with remote devices, communication interface 450 may include, for example, a wired network adapter, a wireless network adapter, and/or a mobile telecommunications adapter.

Figure 6:
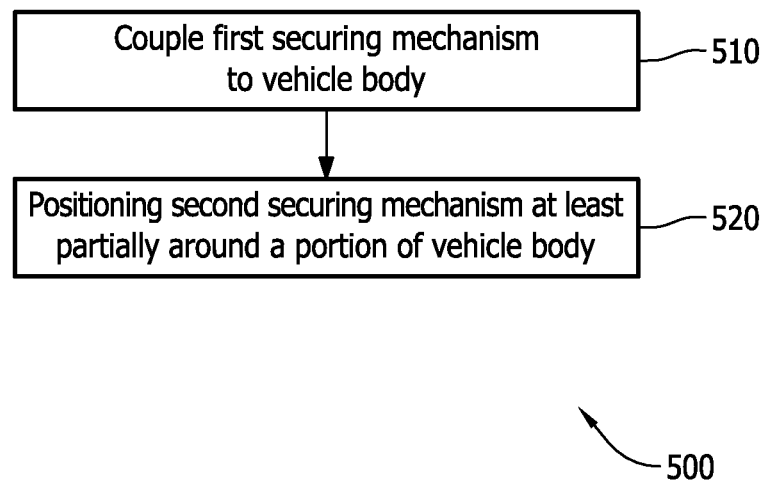
FIG. 6 is a flowchart of an exemplary method that may be implemented by the computing device shown in FIG. 5 to operate the interlocking assembly shown in FIGS. 3 and 4.

FIG. 6 is a flowchart of an exemplary method 500 that may be implemented by computing device 400 (shown in FIG. 5). During operation, vehicle body 130 is approached and/or engaged by handling jig 120 and activates a limit switch (not shown). In the exemplary embodiment, pillar 170 is determined to be in the first position based at least in part on the activation of the limit switch, and first securing mechanism 142 is coupled 510 to vehicle body 130. More specifically, in the exemplary embodiment, pad 150 and/or crowding device 160 are automatically moved towards pillar 170 based at least in part on the activation of the limit switch. Alternatively, pad 150 and/or crowding device 160 may be manually moved towards pillar 170.

In the exemplary embodiment, second securing mechanism 192 is positioned 520 at least partially around a portion of vehicle body 130. More specifically, in the exemplary embodiment, at least one of first arm 210 and second arm 220 is moved towards closed position 214 and 224, respectively, such that first arm 210 and second arm 220 overlap to define first area 280, and pillar 170 extends through at least a portion of first area 280. More specifically, in the exemplary embodiment, first arm 210 is automatically moved towards closed position 214 and activates a switch (not shown), an indication that first arm 210 is in closed position 214 is received, and then second arm 220 is automatically moved towards closed position 224 based at least in part on the indication. Alternatively, first arm 210 and/or second arm 220 may be manually moved towards closed position 214 and 224, respectively.

In the exemplary embodiment, first arm 210, second arm 220, and frame 250 form a substantially continuous loop around pillar 170 to facilitate controlling a behavior of vehicle body 130 in the event vehicle body 130 becomes dislodged from handling jig 120 under an abnormal condition (e.g., machine failure, program anomaly, human error). In the exemplary embodiment, second arm 220 is not in contact with first arm 210, and neither first arm 210 nor second arm 220 are in contact with pillar 170 during normal operation of interlocking assembly 200 when both first arm 210 and second arm 220 are in closed position 214 and 224, respectively. In the event that there is an abnormal condition and vehicle body 130 becomes dislodged from handling jig 120, pillar 170 contacts first arm 210 and forces first arm 210 into second arm 220. Alternatively, pillar 170 may contact second arm 220 and force second arm 220 into first arm 210.

The methods and systems described herein may be implemented using computer programming or engineering techniques including computer software, firmware, hardware or any combination or subset thereof, wherein the technical effects may be achieved by performing at least one of the following steps: a) receiving an indication that the center pillar is in the first position; b) actuating the actuating mechanism to move the first arm towards the closed position; and/or c) actuating the actuating mechanism to move the second arm towards the closed position, such that the first and second arms overlap to define a first area, and the center pillar extends through at least a portion of the first area.

The present disclosure relates to mechanisms and, more particularly, to a non-contact interlocking assembly that controls the behavior of a body being assembled in the event the body becomes dislodged during the assembly process. For example, the non-contact interlocking assembly described herein includes a pair of arms that establish a degree of control of a body while the body is in a state of transfer in a welding process. The arms of the non-contact interlocking assembly do not contact each other, or the body, during normal operation (i.e., while the body is being properly handled during the assembly process).

Exemplary embodiments of a mechanism are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling a behavior of a vehicle body, the method comprising:
    coupling a first securing mechanism to the vehicle body; and
    positioning a second securing mechanism at least partially around a portion of the vehicle body, wherein the second securing mechanism includes a first and second arm coupled to a frame, the second arm including a first extension member, a second extension member extending generally parallel to the first extension member, and a linking member extending between the first and second extension members at a distal portion of the second arm, wherein positioning the second securing mechanism further comprises moving at least one of the first arm and the second arm towards a closed position such that the first and second arms at least partially overlap to define a first area.

2. A method in accordance with claim 1 further comprising receiving a signal indicating the vehicle body is in a first position relative to the first securing mechanism, wherein the first securing mechanism is coupled to the vehicle body upon receipt of the signal.

3. A method in accordance with claim 1, wherein positioning a second securing mechanism further comprises positioning the second securing mechanism, such that the second securing mechanism does not contact the vehicle body.

4. A method in accordance with claim 1, wherein positioning a second securing mechanism further comprises positioning the second securing mechanism, such that the second securing mechanism is configured to control a position of the vehicle body when the vehicle body becomes uncoupled from the first securing mechanism.

5. An interlocking assembly for use in a vehicle assembly environment, the interlocking assembly comprising:
    a frame;
    a first arm coupled to the frame; and
    a second arm coupled to the frame, and comprising a first extension member, a second extension member extending generally parallel to the first extension member, and a linking member extending between the first and second extension members at a distal portion of the second arm, wherein at least one of the first and second arms is moveable between an open position and a closed position, such that the first and second arms overlap to define a first area when the first and second arms are in the closed position.

6. An interlocking assembly in accordance with claim 5, wherein the first arm is coupled to a first portion of the frame, and the second arm is coupled to a second portion of the frame.

7. An interlocking assembly in accordance with claim 5, wherein the first arm and the second arm are each hingably coupled to the frame.

8. An interlocking assembly in accordance with claim 5, wherein the first and second arms are each moveable in a first plane.

9. An interlocking assembly in accordance with claim 5, wherein the first arm comprises a hook at a distal portion of the first arm.

10. An interlocking assembly in accordance with claim 5, wherein the first arm comprises a hook at a distal portion of the first arm, wherein the first arm is oriented to engage the linking member when a force is applied towards the overlap from the first area defined by the first and second arms.

11. An interlocking assembly in accordance with claim 5, wherein the second arm is not in contact with the first arm during normal operation of the interlocking assembly when the first and second arms are in the closed position.

12. A system for use in a vehicle assembly environment, the system comprising:
    a handling jig configured to move a vehicle body towards a first position, the vehicle body including a center pillar;
    an interlocking assembly comprising a first arm and a second arm that are each moveable between an open position and a closed position;
    an actuating mechanism coupled to the interlocking assembly; and
    a computing device coupled to the actuating mechanism, the computing device comprising a processor, and a computer-readable storage media having computer-executable instructions embodied thereon, wherein, when executed by the processor, the computer-executable instructions cause the processor to:
    determine that the center pillar is in the first position; and
    actuate the actuating mechanism to move at least one of the first arm and the second arm towards the closed position, such that the first and second arms overlap to define a first area, and the center pillar extends through at least a portion of the first area.

13. A system in accordance with claim 12, wherein the first arm is coupled to a first portion of a frame, and the second arm is coupled to a second portion of the frame.

14. A system in accordance with claim 12, wherein the first and second arms are each moveable in a first plane.

15. A system in accordance with claim 12, wherein the first arm comprises a hook at a distal portion of the first arm.

16. A system in accordance with claim 12, wherein the second arm comprises a first extension member, a second extension member extending generally parallel to the first extension member, and a linking member extending between the first and second extension members at a distal portion of the second arm.

17. A system in accordance with claim 12, wherein the first arm comprises a hook at a distal portion of the first arm, wherein the first arm is oriented to engage the linking member when a force is applied towards the overlap from the first area defined by the first and second arms.

18. A system in accordance with claim 12, wherein the second arm is not in contact with the first arm, and neither the first arm nor the second arm are in contact with the center pillar, during normal operation of the interlocking assembly when the first and second arms are in the closed position.

* * * * *